United States Patent
Tran et al.

(10) Patent No.: US 7,702,011 B2
(45) Date of Patent: Apr. 20, 2010

(54) HIGH-SPEED SERIAL DATA RECEIVER ARCHITECTURE

(75) Inventors: Thungoc Tran, San Jose, CA (US); Sergey Yuryevich Shumarayev, San Leandro, CA (US); Simardeep Maangat, Sunnyvale, CA (US); Wilson Wong, San Francisco, CA (US); Rakesh Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1020 days.

(21) Appl. No.: 11/361,192

(22) Filed: Feb. 23, 2006

(65) Prior Publication Data

US 2007/0041455 A1 Feb. 22, 2007

Related U.S. Application Data

(60) Provisional application No. 60/705,689, filed on Aug. 3, 2005.

(51) Int. Cl.
*H03H 7/30* (2006.01)
(52) U.S. Cl. ....................................... 375/232
(58) Field of Classification Search ................. 375/229, 375/232–236, 257, 350; 708/322, 323; 333/18, 333/28 R
See application file for complete search history.

(56) References Cited

U.S. PATENT DOCUMENTS 4,785,411 A * 11/1988 Thompson et al. .......... 708/322
5,432,827 A * 7/1995 Mader ........................ 375/376
5,670,916 A * 9/1997 Korn ............................ 333/18
5,710,823 A * 1/1998 Nagata et al. ................. 381/83
6,366,613 B2 * 4/2002 Sommer et al. ............. 375/232
2004/0141552 A1 7/2004 Yang et al.
2005/0276350 A1* 12/2005 Li .............................. 375/302
2006/0093075 A1* 5/2006 Radich ........................ 375/341
2007/0202814 A1* 8/2007 Ono et al. ..................... 455/78

OTHER PUBLICATIONS

Diego Vazquez et al., "A High-Q Bandpass Fully Differential SC Filter with Enhanced Testability," IEEE Journal of Solid-State Circuits, IEEE Service Center, Piscataway, NJ, US vol. 33, No. 7, Jul. 1998.
"Digital cellular telecommunications system (Phase 2+)," ETSI Standards, European Telecommunications Standards Institute, Sophia-Antipo, FR, vol. 3-G2, No. V420, Jul. 2002.

* cited by examiner

*Primary Examiner*—Don N Vo
(74) *Attorney, Agent, or Firm*—Ropes & Gray LLP; Robert R. Jackson

(57) ABSTRACT

Serial data signal receiver circuitry for inclusion on a PLD includes a plurality of equalizer circuits that are connected in series and that are individually controllable so that collectively they can compensate for a wide range of possible input signal attenuation characteristics. Other circuit features may be connected in relation to the equalizer circuits to give the receiver circuitry other capabilities. For example, these other features may include various types of loop-back test circuits, controllable termination resistance, controllable common mode voltage, and a controllable threshold for detection of an input signal. Various aspects of control of the receiver circuitry may be programmable.

15 Claims, 6 Drawing Sheets

HIGH-SPEED SERIAL DATA RECEIVER ARCHITECTURE

This application claims the benefit of U.S. provisional patent application No. 60/705,689, filed Aug. 3, 2005, which is hereby incorporated by reference herein in its entirety.

BACKGROUND OF THE INVENTION

This invention relates to programmable logic devices ("PLDs") and other integrated circuits of that general type (all generically referred to for convenience as PLDs). More particularly, the invention relates to high-speed serial data receiver circuitry for inclusion on PLDs.

PLDs are intended as relatively general-purpose devices. A PLD can be programmed (configured) to meet any need within the range of needs that the PLD is designed to support. A PLD may be equipped with high-speed serial data communication circuitry, whereby the PLD can transmit serial data to and/or receive serial data from circuitry that is external to the PLD. In that case, it is desirable for the high-speed serial data communication circuitry of the PLD to be able to support various communication protocols that various users of the PLD product may wish to employ. It is also desirable for the PLD's high-speed serial data communication circuitry to be able to perform successfully in various circuit or system contexts. This invention provides high-speed serial data receiver circuitry that can be configured to meet a wide range of possible needs.

SUMMARY OF THE INVENTION

Serial data signal receiver circuitry in accordance with the invention includes a plurality of equalizer circuits that are connected in series and that are individually controllable so that collectively they can compensate for any of a wide range of possible input signal attenuation characteristics. Other circuit features may be connected in relation to the equalizer circuits to give the receiver circuitry other capabilities. For example, these other features may include various types of loop-back test circuits, controllable termination resistance, controllable common mode voltage, and a controllable threshold for detection of an input signal. Various aspects of control of the receiver circuitry may be programmable.

Further features of the invention, its nature and various advantages, will be more apparent from the accompanying drawings and the following detailed description.

BRIEF DESCRIPTION OF THE DRAWINGS

FIG. 4 is again for an illustrative embodiment of the invention.

DETAILED DESCRIPTION

Transceiver design becomes more complicated as the data rate keeps increasing. For example, increased data rates typically result in degradation of signal integrity across the transmission medium. The design of the signal receiver is very important to the task of recovering a poor quality signal from a lossy interconnect, especially at high frequencies. In the area of field-programmable gate arrays ("FPGAs" (another term for PLDs)) it is desirable for a receiver to be able to support a wide range of possible applications. The receivers of this invention address issues related to signal integrity and special features.

Figure 1:
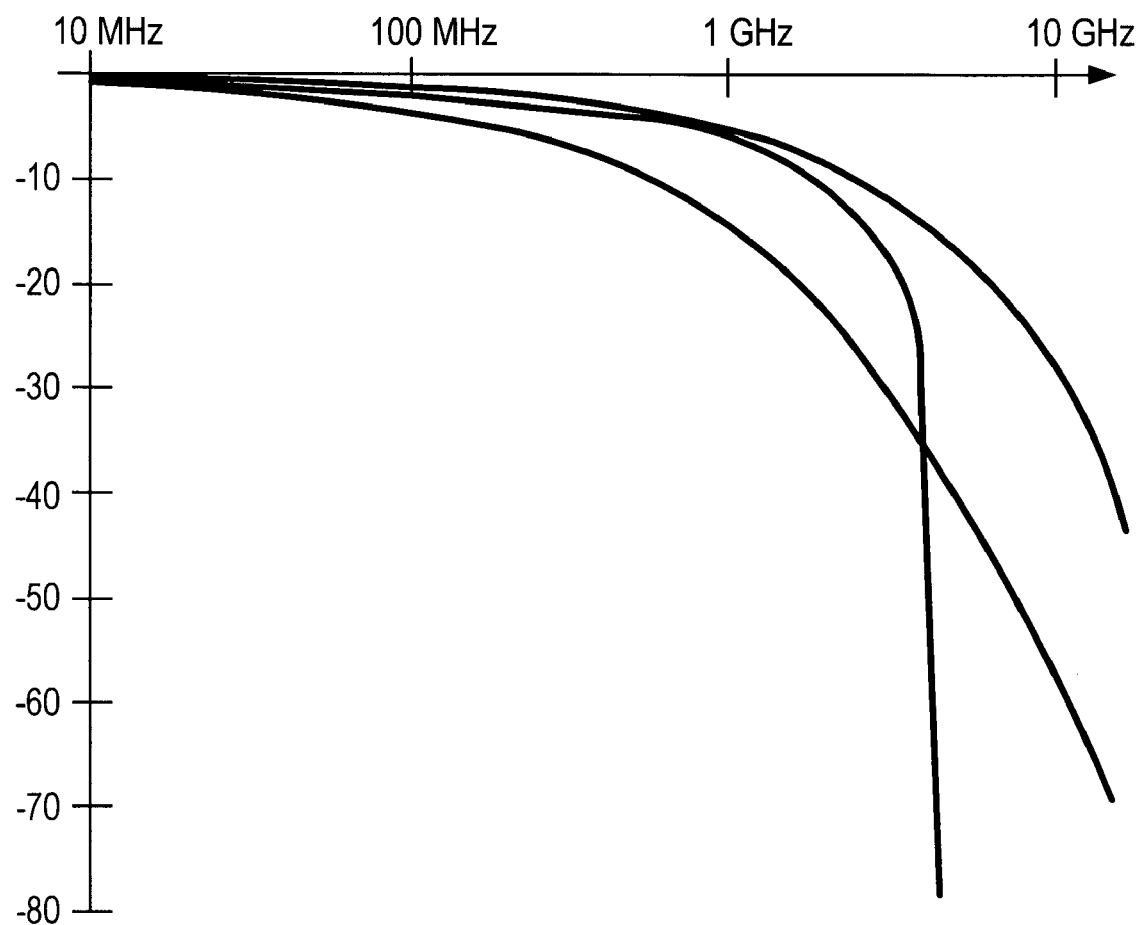
FIG. 1 is a simplified graph of several signal attenuation characteristics that are useful in explaining certain aspects of the invention.

With regard to signal integrity, on the transmitter side, pre-emphasis can be used to help "open the eye" of the signal at the receiver (see, for example, commonly assigned, Tran et al. U.S. Pat. No. 7,355,449) for transmitter circuitry that is capable of giving a transmitted signal pre-emphasis). However, too much pre-emphasis can cause cross-talk. Each PLD user's board design (e.g., printed circuit board or back-plane design) also has different characteristics. For example, FIG. 1 plots just a few representative back-plane attenuation curves from typical applications. It will be noted that the pole location of each curve is not the same, and that different slopes are observed in different ranges of frequency.

With regard to special features, it is desirable for many communication protocols to provide loss-of-signal detection. Also, the communication protocol known as PCI-E is an example of a protocol that requires a receiver to have an electrical idle capability.

Figure 2:
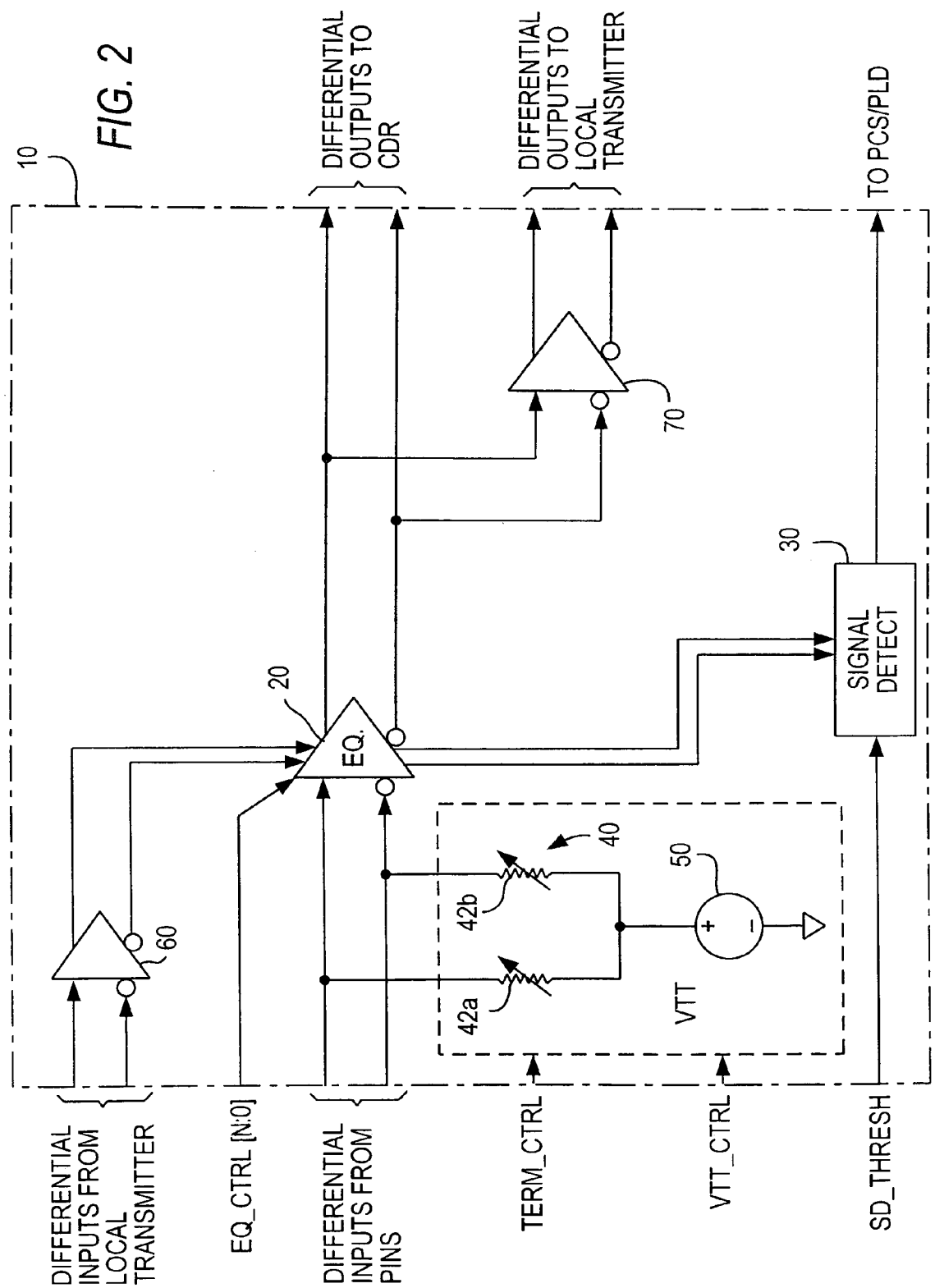
FIG. 2 is a simplified schematic block diagram of an illustrative embodiment of circuitry in accordance with the invention.

FIG. 2 shows an illustrative embodiment of high-speed serial data receiver circuitry 10 in accordance with the invention. For example, circuitry 10 may be designed to operate at data rates up to approximately 6 Gbps (giga-bits per second). It is emphasized that in a PLD context, receiver circuitry 10 is preferably able to operate at any frequency in a fairly wide range of frequencies, and that 6 Gbps is just one example of a data rate that may be in the operating range of the receiver. In other embodiments of the invention the operating range may be different and may not include 6 Gbps.

As shown in FIG. 2, circuitry 10 includes equalization block 20, signal detect block 30, termination block 40, common mode driver block 50, serial loop-back buffer 60, and diagnostic loop-back buffer 70.

Figure 3:
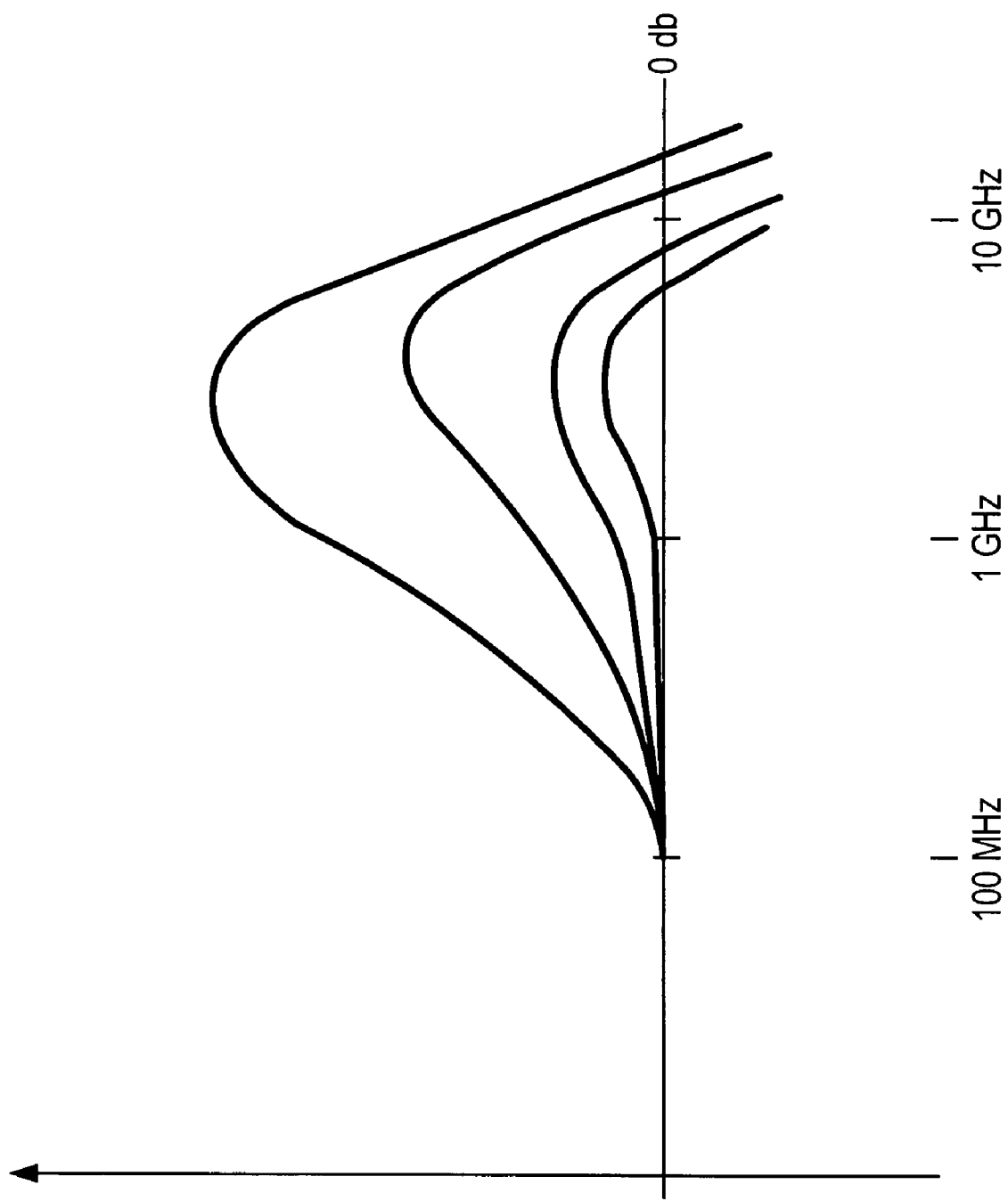
FIG. 3 is a simplified graph of several illustrative frequency response characteristics that are achievable in accordance with the invention.

The main function of equalization block 20, which is preferably programmable to at least some degree, is to reduce demands on the larger receiver circuitry of the associated PLD. This larger receiver circuitry, which may include clock and data recovery ("CDR") circuitry downstream from circuitry 10, needs to convert the incoming serial data signal into digital signal levels without error. Examples of error sources are inter-symbol interference ("ISI") and reduced signal-to-noise ratio ("SNR"), which are often characteristics of high-frequency signal attenuation. Equalizer 20 preferably does not require any initial training sequence. FIG. 3 shows several examples of the many possible frequency responses of equalizer 20 over a wide range of frequencies. As FIG. 3 shows, the gain of equalizer 20 is selectable to have any of many different possible levels, from a very low gain (which is useful in a short interconnect, chip-to-chip application) to a high gain (which may be required for a back-plane application with loss curves like those shown in FIG. 1). The signals EQ_CTRL [n:0] provide setting selection for equalizer 20, where n can be a number large enough to permit representation of as many as a few thousand different control values. Signals EQ_CTRL may come from programmable memory on the PLD (so-called configuration random access memory or CRAM). A possible alternative to CRAM control is mentioned later in this specification.

Figure 4:
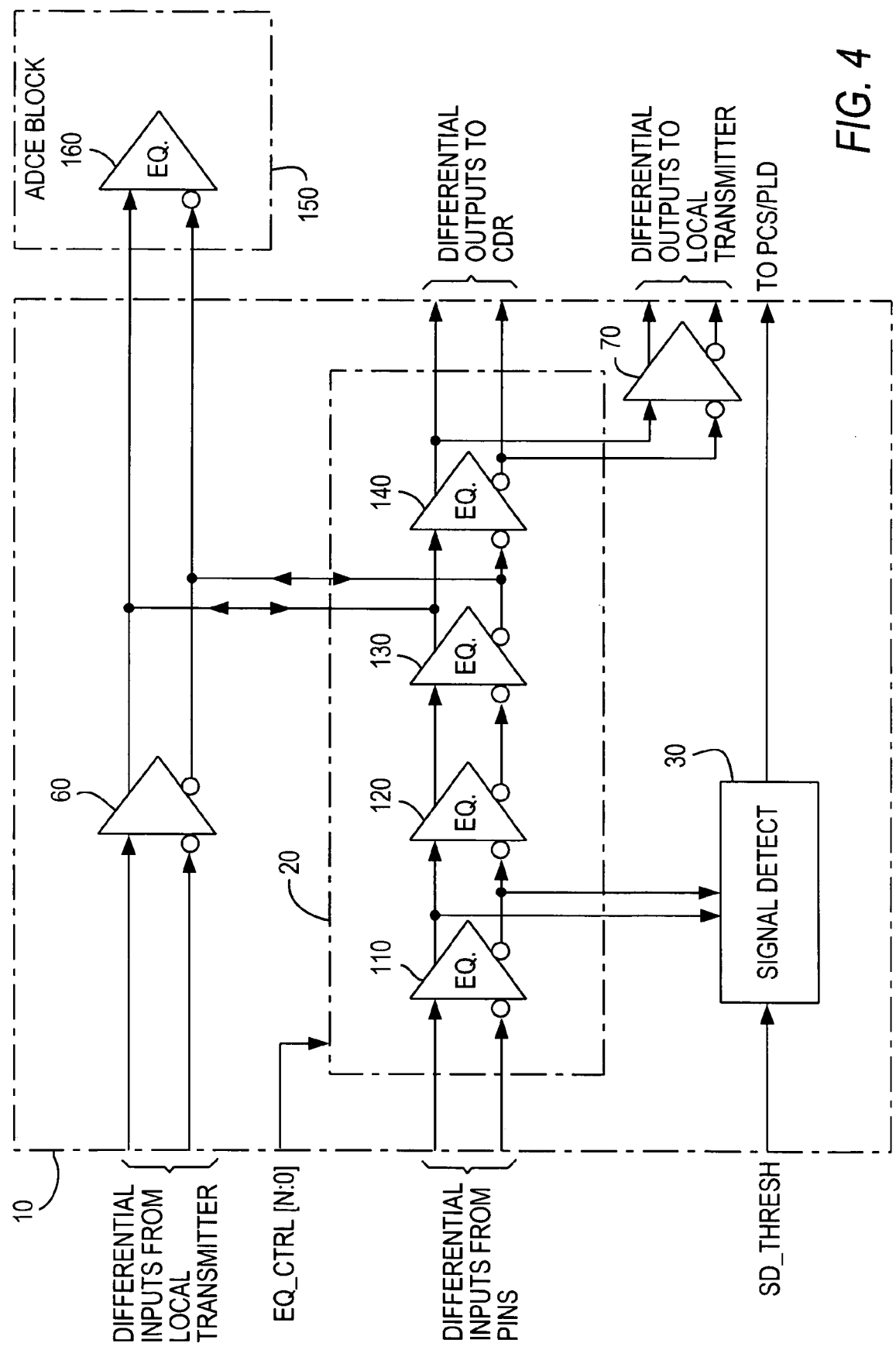
FIG. 4 is a more detailed, but still simplified, schematic block diagram of portions of what is shown in FIG. 2.
Figure 5:
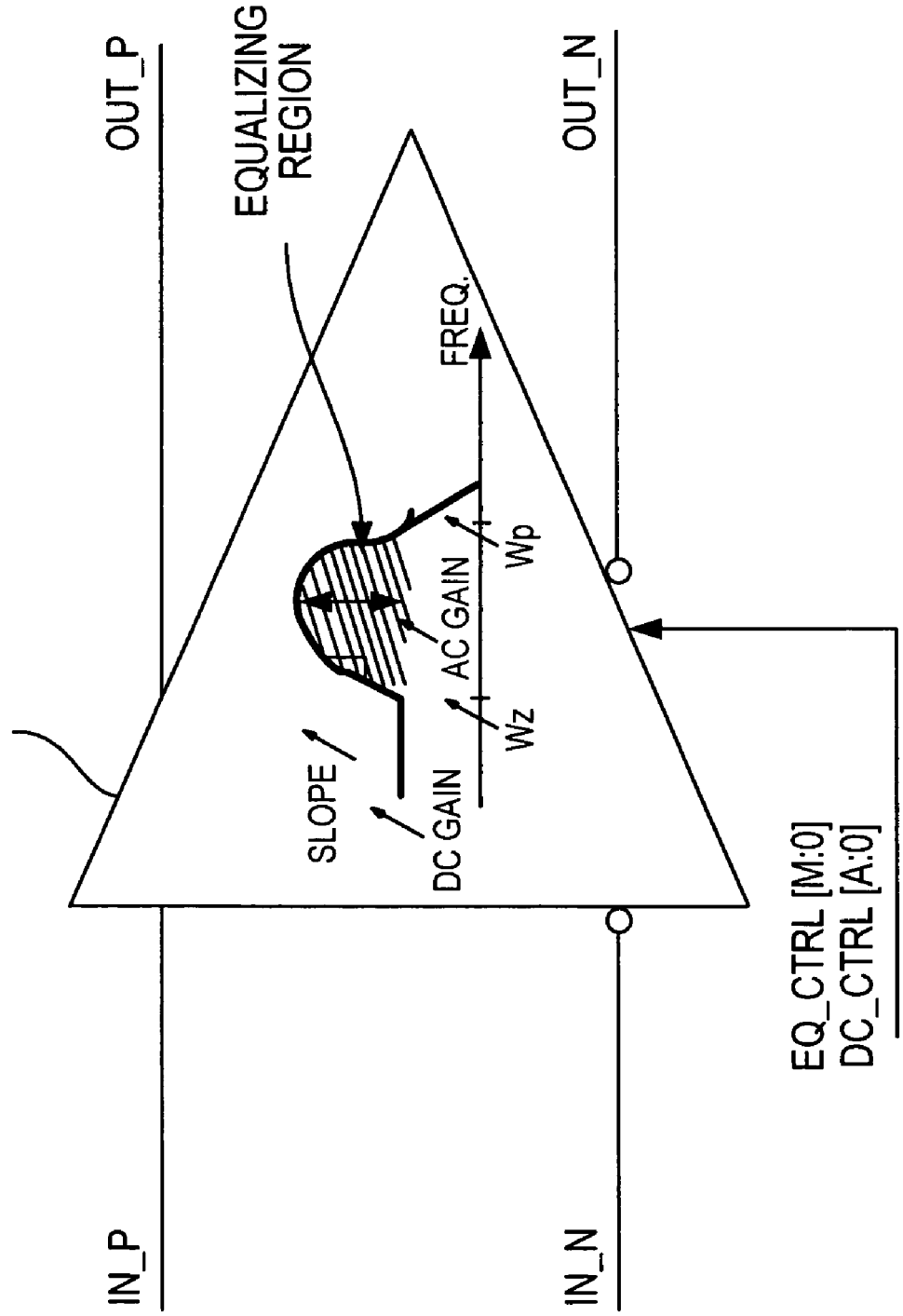
FIG. 5 is a simplified block diagram of an illustrative embodiment of a representative portion of the circuitry shown in FIG. 4.

To counteract poles of different back-planes having different locations, the zero location in circuitry 20 is flexible. Up to about 8 Gbps, a fourth-order function will curve fit the typical attenuation curve. FIG. 4 therefore shows an illustrative embodiment of equalizer block 20 that includes four stages 110, 120, 130, and 140 to introduce four zeros to cancel out the possibility of as many as four poles in the back-plane. A generalized depiction that can apply to any one of equalizer stages 110, 120, 130, or 140 is shown in FIG. 5. This FIG. shows that each equalizer stage can have the following controllably variable parameters: (1) DC gain, (2) AC gain, (3) slope, (4) low frequency limit Wz, and (5) high frequency limit Wp. The values of these various parameters are determined by control input signals EQ_CTRL[m:0] and DC_CTRL[a:0]. Again, the EQ_CTRL and DC_CTRL signals may come from CRAM (or another possible alternative that is mentioned later).

Figure 6:
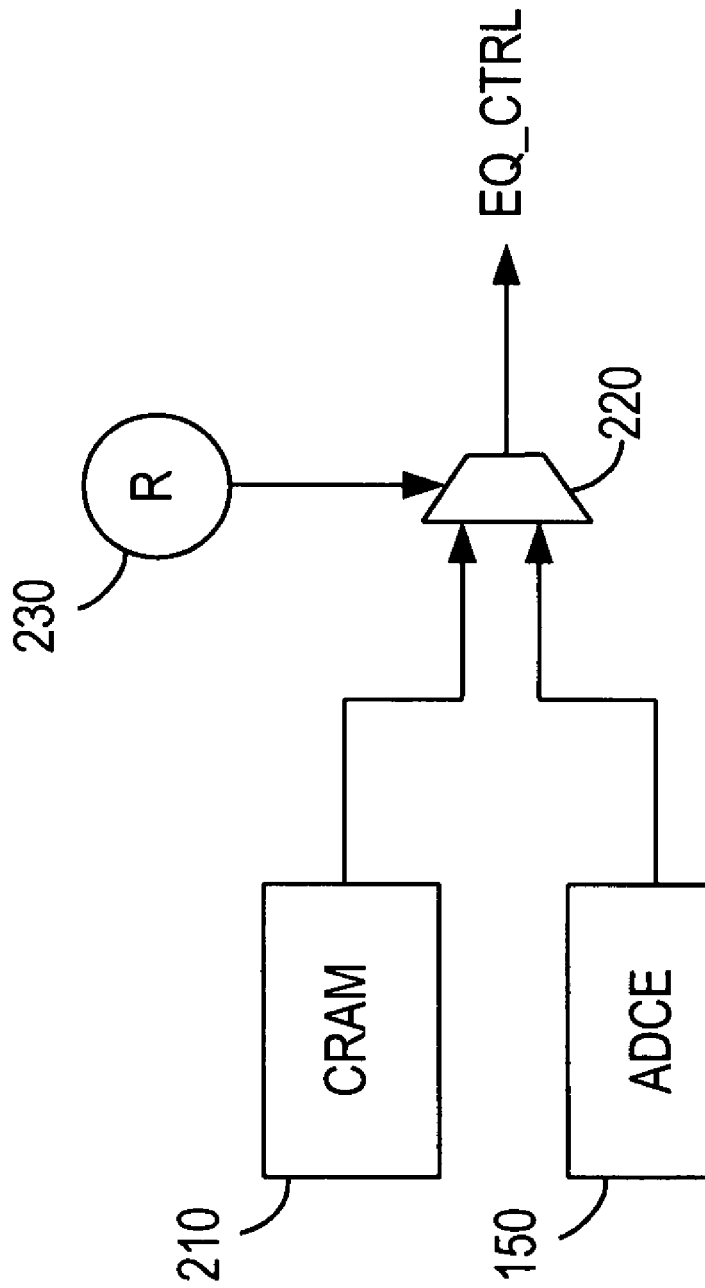
FIG. 6 is a simplified schematic block diagram of an illustrative embodiment of optional circuitry in accordance with the invention.

FIG. 4 also shows preferred locations for other blocks to connect to equalizer circuitry 20 to enhance performance by the distribution of load. For example, FIG. 4 shows that the outputs of loop-back buffer 60 are preferably applied to the inputs of the last stage 140 of equalizer circuitry 20. (The inputs to loop-back buffer 60 come from serial data transmitter circuitry on the PLD that includes circuitry 10. The loop-back path through buffer 60 can be used to test the transmitter path circuitry of the PLD.) As another example, FIG. 4 shows that the inputs of loop-back buffer 70 preferably come from the outputs of the final stage 140 of equalization circuitry 20. (The outputs of loop-back buffer 70 are applied to transmitter circuitry on the PLD that includes circuitry 10. This loop-back path can be used to send a signal back to the source of the serial data input to circuitry 10 to enable that source to test its link to circuitry 10, as well as the ability of circuitry 10 to deal with the signal it has received.) As still another example, FIG. 4 shows how the paths to the CDR circuitry and adaptive dispersion compensation engine ("ADCE") circuitry 150 are preferably split. In particular, this is preferably done upstream from the final stage 140 of equalizer circuitry 20, and with the addition of a dummy equalizer stage 160 in ADCE circuitry 150 to reduce/balance the load to the four stages 110, 120, 130, and 140 of circuitry 20. (ADCE circuitry 150 may be used in conjunction with the receiver circuitry to determine proper settings for the equalizer automatically, instead of "manually" controlling the EQ_CTRL[n:0] signals. Thus ADCE control of EQ_CTRL is a possible alternative to CRAM control of EQ_CTRL. FIG. 6 (described below) shows an example of how this may be implemented on a PLD that includes circuitry 10.) As shown in FIG. 5, circuitry 20 also has DC gain options that are preferably applied only to the first two stages 110 and 120 to reduce offset. Such offset may be due to process mismatch, layout-dependent offset, random offset, or the like. All stages 110, 120, 130, and 140 may be the same or substantially the same (e.g., as shown in FIG. 5), but the DC_CTRL for stages 130 and 140 may be hard-wired to 0.

Another feature that circuitry 10 preferably includes is on-chip termination that can be calibrated to offset variation due to PVT (process, voltage, temperature). This feature is provided by variable resistors 42a and 42b, which are connected in series between the two differential inputs to equalizer circuitry 20. The combined value of resistors 42a and 42b can be selected to achieve a balance between accuracy of the termination impedance and the load on the input pins to enhance performance. For example, the signal(s) TERM_CTRL in FIG. 2 may allow selection of a 100, 120, or 150 ohm differential between the inputs to equalizer circuitry 20. In this example, each of resistors 42 is controllable to have resistance of 50, 60, or 75 ohms. The signal(s) TERM_CTRL may come from CRAM (similar to CRAM described earlier in this specification) to make the value of the termination resistance programmably selectable.

Circuitry 10 also preferably provides a low impedance termination path to common mode voltage (i.e., at the node between resistors 42a and 42b). In addition, this voltage is preferably programmable for selection of the level required to support any of several communication protocols. Voltage source 50 is controlled by signal(s) VTT_CTRL to provide the desired common mode voltage offset from ground. The VTT_CTRL signal(s) may come from CRAM (again similar to CRAM described earlier in this specification).

With regard to signal detect circuitry 30 in FIGS. 2 and 4, different communication protocols have different specifications for the permitted minimum differential input level. The control bit(s) SD_THRESH allow selection of different threshold levels for different specifications. Once again, SD_THRESH may come from CRAM (similar to CRAM described earlier) to make the minimum differential input level required by circuitry 30 programmable. The output signal of circuitry 30 indicates whether or not that required minimum differential input level is present. This output signal is applied to the physical coding sublayer (PCS) of the PLD, and possibly from there to other circuitry of the PLD.

Signal detect circuitry 30 can be used to support an "electrical idle" mode. Circuitry 30 can flag entering into and exiting out of electrical idle state by detecting the presence or absence of a signal presented at the receiver input pin. If that signal is below a threshold (e.g., SD_THRESH), that means there is no signal or idle. If the signal is above the threshold, that means the associated transmitter is in transmitting state (i.e., out of idle).

Various testability features that are preferably provided by circuitry 10 have already been mentioned, but will now be discussed further. A bypass mode of transmitter circuitry (not shown) on the PLD that includes circuitry 10 can be done through serial loop-back buffer 60. It is also possible to bypass the CDR circuitry to check the quality of equalizer 20. This is done through diagnostic loop-back buffer 70.

FIG. 6 illustrates the point that—if it is desired to provide such a feature on the PLD—the EQ_CTRL signals can come either from CRAM 210 on the PLD or from ADCE circuitry 150 on the PLD. Multiplexer ("mux") circuitry 220 selects which of these two possible sources is used. The choice made by mux 220 may be programmably controlled by additional CRAM 230.

From the foregoing it will be appreciated that the serial data signal receiver architecture of this invention is capable of satisfying a wide range of applications. This architecture enhances performance while avoiding the overhead of carrying too many supporting features.

The invention claimed is:
1. High-speed serial data signal receiver circuitry for an integrated circuit device (IC) comprising:
   a plurality of equalizer circuits connected in series, each of the equalizer circuits being individually controllable with respect to at least one equalization characteristic performed by that equalizer circuit on a serial data signal applied to that equalizer circuit; and a loop-back connection for applying a serial data signal from serial data signal transmitter circuitry of the IC to a point intermediate two of the equalizer circuits.

2. The circuitry defined in claim 1 wherein the point is between a next-to-last of the equalizer circuits in the series and a last of the equalizer circuits in the series.

3. The circuitry defined in claim 2 wherein the series includes at least one more of the equalizer circuits preceding the next-to-last equalizer circuit.

4. The circuitry defined in claim 3 further comprising:
a second loop-back connection from an output of a last one of the equalizer circuits in the series to serial data signal transmitter circuitry of the IC.

5. High-speed serial data signal receiver circuitry for an integrated circuit device (IC) comprising:
a plurality of equalizer circuits connected in series, each of the equalizer circuits being individually controllable with respect to at least one equalization characteristic performed by that equalizer circuit; and
signal detect circuitry connected to a point intermediate two of the equalizer circuits,
wherein the point is between an initial one of the equalizer circuits in the series and a next-to-initial one of the equalizer circuits in the series,
wherein the high-speed serial data signal receiver circuitry receives a serial data signal that comprises a differential signal pair, and wherein the circuitry further comprises:
termination resistor circuitry connected between the pair and having controllable resistance,
wherein the termination resistor circuitry includes a common mode voltage node having a low impedance connection to ground potential, and
wherein the connection includes controllable voltage source circuitry connected in series between the common mode voltage mode and the ground potential.

6. The circuitry defined in claim 5 wherein the series includes at least one more of the equalizer circuits following the next-to-initial equalizer circuit.

7. The circuitry defined in claim 6 wherein the at least one controllable equalization characteristic of at least the initial and next-to-initial equalizer circuits includes DC gain of those equalizer circuits.

8. The circuitry defined in claim 7 wherein DC gain of the at least one more equalizer circuit is fixed.

9. The circuitry defined in claim 5 wherein the at least one equalization characteristic is programmably controllable.

10. The circuitry defined in claim 5 wherein the controllable resistance is programmably controllable.

11. The circuitry defined in claim 5 wherein the voltage of the controllable voltage source is programmably controllable.

12. The circuitry defined in claim 5 wherein the signal detect circuitry employs a controllable threshold to determine whether or not a signal is detected.

13. The circuitry defined in claim 12 wherein the controllable threshold is programmably controllable.

14. High-speed serial data signal receiver circuitry for an integrated circuit device (IC) comprising:
a plurality of more than two equalizer circuits connected in series, each of the equalizer circuits being individually controllable with respect to at least one equalization characteristic performed by that equalizer circuit; and
adaptive dispersion compensation engine circuitry connected to receive a serial data signal from only a point between a next-to-last of the equalizer circuits in the series and a last on the equalizer circuits in the series, the adaptive dispersion compensation engine circuitry being responsive to the serial data signal to provide control signals for all of the equalizer circuits.

15. The circuitry defined in claim 14 wherein the adaptive dispersion compensation engine circuitry includes dummy equalizer in circuitry.

* * * * *